(12) United States Patent
Lipshitz et al.

(10) Patent No.: US 8,457,680 B1
(45) Date of Patent: *Jun. 4, 2013

(54) HIGH-ACCURACY TRANSMIT POWER CONTROL WITH HIGH-EFFICIENCY OPERATION AMPLIFIER OPERATION

(75) Inventors: David Lipshitz, Ra'anana (IL); Alexander Zaslavsky, Petach Tikva (IL)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,231

(22) Filed: Aug. 16, 2012

Related U.S. Application Data

(63) Continuation of application No. 12/772,212, filed on May 2, 2010, now Pat. No. 8,260,226.

(60) Provisional application No. 61/255,811, filed on Oct. 28, 2009.

(51) Int. Cl.
*H04W 74/00* (2009.01)

(52) U.S. Cl.
USPC ........................................ 455/522; 455/127.2

(58) Field of Classification Search
USPC .................. 455/522, 69, 115.3, 114.3, 127.2, 455/127.3, 127.1
See application file for complete search history.

(56) References Cited

U.S. PATENT DOCUMENTS

| | | | |
|---|---|---|---|
| 6,236,863 B1 | 5/2001 | Waldroup et al. | |
| 6,498,785 B1 | 12/2002 | Derryberry et al. | |
| 6,735,420 B2 * | 5/2004 | Baldwin | 455/127.2 |
| 6,788,138 B2 | 9/2004 | Suzuki | |
| 7,421,255 B2 | 9/2008 | Inamori et al. | |
| 7,532,680 B2 | 5/2009 | Vayrynen et al. | |
| 7,724,086 B2 | 5/2010 | Camuffo et al. | |
| 7,747,227 B2 | 6/2010 | Fukuda et al. | |
| 7,805,116 B2 | 9/2010 | Xu et al. | |
| 7,974,596 B2 | 7/2011 | Lim et al. | |
| 7,977,947 B1 | 7/2011 | Jones et al. | |
| 7,991,367 B2 | 8/2011 | Pratt et al. | |
| 8,095,166 B2 | 1/2012 | Sampath et al. | |
| 8,249,531 B2 | 8/2012 | Xu et al. | |
| 8,260,226 B1 | 9/2012 | Lipshitz et al. | |
| 2005/0227646 A1 | 10/2005 | Yamazaki et al. | |
| 2006/0240784 A1 * | 10/2006 | Naguib et al. | 455/73 |
| 2006/0270367 A1 | 11/2006 | Burgener et al. | |

(Continued)

OTHER PUBLICATIONS

3GPP TS 25.101 "Technical Specification Group Radio Access Network; User Equipment (UE) Radio Transmission and Reception (FDD)", Release 8, version 8.5.1, 214 pages, Jan. 2009.

(Continued)

*Primary Examiner* — Tu X Nguyen

(57) ABSTRACT

A method in a transmitter including a transmission chain and a Power Amplifier (PA), includes storing calibration data relating a plurality of specified output power levels of the transmitter to respective PA control voltages for application to the PA and respective gain levels for application to the transmission chain that cause the transmitter to output signals at the specified output power levels. A target output power level is specified, and an actual control voltage is applied to the PA. The actual control voltage is derived from a specified target control voltage depending on the target output power. A modified gain level which, when applied to the transmission chain while the PA is controlled with the actual control voltage, causes the transmitter to output the signals at the target output power level, is computed based on the calibration data. The modified gain level is applied to the transmission chain.

20 Claims, 3 Drawing Sheets

U.S. PATENT DOCUMENTS

| | | | |
|---|---|---|---|
| 2007/0243838 A1* | 10/2007 | Lang | 455/127.1 |
| 2007/0270174 A1 | 11/2007 | Heinonen et al. | |
| 2008/0220806 A1 | 9/2008 | Shin et al. | |
| 2009/0111399 A1* | 4/2009 | Norris et al. | 455/114.3 |
| 2009/0163155 A1 | 6/2009 | Camuffo et al. | |
| 2010/0008410 A1 | 1/2010 | Shute et al. | |
| 2010/0029226 A1 | 2/2010 | Visser | |
| 2010/0311474 A1 | 12/2010 | Donovan et al. | |

OTHER PUBLICATIONS

3GPP TS 34.121 "Technical Specification Group Radio Access Network; Terminal Conformance Specification; Radio Transmission and Reception (FDD)", Release 6, version 6.4.0, 21 pages, Mar. 2006.

U.S. Appl. No. 12/772,211, filed May 2, 2010 (33 pages).

U.S. Appl. No. 12/814,456, filed Jun. 13, 2010 (45 pages).

U.S. Appl. No. 12/772,211 Official Action dated Sep. 28, 2011 (8 pages).

U.S. Appl. No. 12/772,211 Official Action dated Feb. 17, 2012 (15 pages).

U.S. Appl. No. 12/772,211 Official Action dated Sep. 7, 2012 (16 pages).

U.S. Appl. No. 12/814,456 Ex Parte Quayle Action dated Sep. 24, 2012 (7 pages).

U.S. Appl. No. 12/722,211 Office Action dated Dec. 6, 2012.

* cited by examiner

HIGH-ACCURACY TRANSMIT POWER CONTROL WITH HIGH-EFFICIENCY OPERATION AMPLIFIER OPERATION

CROSS-REFERENCE TO RELATED APPLICATIONS

This application is a continuation of U.S. patent application Ser. No. 12/772,212, filed May 2, 2010, which claims the benefit of U.S. Provisional Patent Application 61/255,811, filed Oct. 28, 2009. This application is related to U.S. patent application Ser. No. 12/772,211, entitled "Setting of Power Amplifier Control Voltage,", filed May 2, 2010, which is assigned to the assignee of the present patent application. The disclosures of all these related applications are incorporated herein by reference.

FIELD OF THE DISCLOSURE

The present disclosure relates generally to communication systems, and particularly to methods and systems for power control in Radio Frequency (RF) transmitters.

BACKGROUND

Various communication systems modify the power of transmitted signals, for example in order to adapt to current channel conditions. Such techniques are commonly referred to as transmit power control. For example, Technical Specification Group (TSG) RAN WG4 of the $3^{rd}$ Generation Partnership Project (3GPP) specifies the transmission and reception characteristics of Universal Mobile Telecommunications System (UMTS) User Equipment (UE) in a specification entitled "UE Radio Transmission and Reception (FDD)," TS 25.101, version 8.5.1, January, 2009, which is incorporated herein by reference. In particular, section 6.5 specifies the accuracy and timing requirements of output power setting in UMTS UEs. Conformance test procedures for verifying compliance of UMTS UEs with power control specifications are defined in a 3GPP Technical Specification entitled "Terminal Conformance Specification; Radio Transmission and Reception (FDD) (Release 6)," TS 34.121, version 6.4.0, March, 2006, which is incorporated herein by reference.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

An embodiment that is described herein provides a method for transmit power control in a transmitter that includes a transmission chain and a Power Amplifier (PA). The method includes storing calibration data relating a plurality of specified output power levels of the transmitter to respective PA control voltages for application to the PA and respective gain levels for application to the transmission chain that cause the transmitter to output signals at the specified output power levels. A target output power level of the transmitter is specified, and an actual control voltage is applied to the PA. The actual control voltage is derived from a specified target control voltage that depends on the specified target output power. A modified gain level which, when applied to the transmission chain while the PA is controlled with the actual control voltage, causes the transmitter to output the signals at the target output power level, is computed based on the calibration data. The modified gain level is applied to the transmission chain In some embodiments, the target output power level differs from an output power level that is related to the target control voltage in the calibration data. In an embodiment, the calibration data specifies no more than a single PA control voltage and a single gain level for each output power level. In a disclosed embodiment, storing the calibration data includes storing a first relation that defines the PA control voltages to be applied to the PA for outputting the signals at the respective output power levels, and storing a second relation that defines the gain levels which, when applied to the transmission chain while the PA is controlled using the respective control voltages defined by the first relation, cause the transmitter to output the signals at the respective output power levels.

In an embodiment, storing the first relation includes determining the first relation by characterizing a type of the transmitter. In another embodiment, computing the modified gain level includes computing an extrapolated value of the second relation at the target output power, by extrapolating a subset of the second relation including the gain levels corresponding to the actual control voltage. In yet another embodiment, storing the calibration data includes storing a third relation that maps the output power levels to respective values indicative of gradients of a dependence of the gain levels on the output power levels. In an embodiment, storing the second and third relations includes determining the second and third relations by individually calibrating the transmitter.

In some embodiments, applying the actual control voltage includes applying a control voltage that is nearest to and not smaller than the target control voltage among the PA control voltages defined in the calibration data. In an embodiment, applying the actual control voltage includes deriving the actual control voltage from a minimal control voltage that causes the transmitter to output the signals at the target output power level.

There is additionally provided, in accordance with an embodiment that is described herein, a transmitter that includes a transmission chain, a Power Amplifier (PA) driven by the transmission chain, a memory and a controller. The memory is configured to store calibration data, which relate a plurality of specified output power levels of the transmitter to respective PA control voltages for application to the PA and respective gain levels for application to the transmission chain that cause the transmitter to output signals at the specified output power levels. The controller is configured to accept a specification of a target output power level of the transmitter, to apply to the PA an actual control voltage that is derived from a specified target control voltage that depends on the specified target output power, to compute, based on the calibration data, a modified gain level which, when applied to the transmission chain while the PA is controlled with the actual control voltage, causes the transmitter to output the signals at the target output power level, and to apply the modified gain level to the transmission chain.

An additional embodiment provides a mobile communication terminal including the disclosed transmitter. Yet another embodiment provides a chipset for processing signals in a mobile communication terminal, including the disclosed transmitter.

The present disclosure will be more fully understood from the following detailed description of the embodiments thereof, taken together with the drawings in which:

DETAILED DESCRIPTION OF EMBODIMENTS

Figure 1:
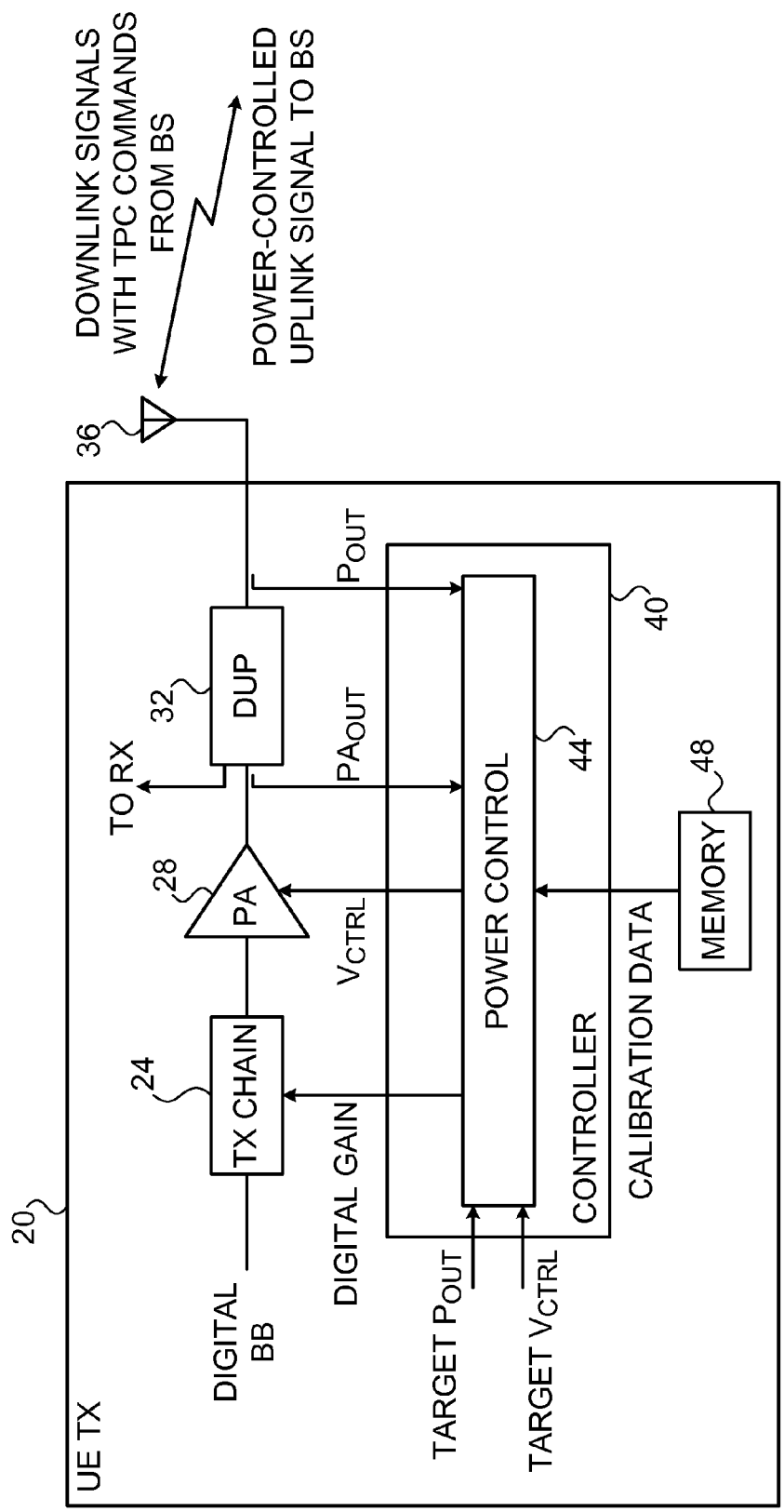
FIG. 1 is a block diagram that schematically illustrates a transmitter that uses power control, in accordance with an embodiment of the present disclosure.

Embodiments that are described herein provide improved methods and systems for controlling the transmit power of Radio Frequency (RF) transmitters. In some embodiments, a transmitter comprises a transmission chain that drives a Power Amplifier (PA). The gain of the transmission chain is adjustable by setting a digital gain value, and the PA efficiency and gain are controlled, amongst other controls, by adjusting a PA control voltage. In an embodiment, it is desirable to select a lowest possible PA control voltage, in combination with an appropriate digital gain that is capable of achieving a target transmit power.

In some embodiments, the transmitter stores calibration data, which defines digital gain values and PA control voltages for respective possible output power levels of the transmitter. A controller sets the appropriate digital gain value and PA control voltage for causing the transmitter to transmit at a requested target output power, based on the calibration data.

In practice, however, the actual operating conditions of the transmitter (e.g., frequency, temperature and/or signal modulation) often differ from the operating conditions for which the calibration data was obtained. As a result, the digital gain and PA control voltage for a respective target output power level of the transmitter defined in the calibration data may not achieve the desired target output power and efficiency.

In some embodiments, the transmitter is requested to transmit a signal at a certain target output power. In response to the request, the controller determines a target PA control voltage that is suitable for transmitting at this output power. For example, the controller may choose a relatively low target PA control voltage, which causes the PA to operate at high efficiency while still producing the signal at the target output power and at an acceptable signal fidelity.

The target PA control voltage chosen by the controller often differs from the PA control voltage that corresponds to the target output power in the calibration data. Such a difference occurs, for example, when the actual operating conditions of the transmitter differ from the operating conditions used for calibration. In order to cause the transmitter to transmit at the target output power and at high efficiency in spite of the different operating conditions, in an embodiment the controller determines an actual PA control voltage that will actually be applied to the PA. The controller derives the actual PA control voltage from the target PA control voltage, using the calibration data. In addition, the controller computes a modified digital gain for application to the transmission chain. The modified digital gain is computed based on the actual PA control voltage and on the calibration data. Example methods for deriving the actual PA control voltage and the modified digital gain are described herein.

The techniques described herein enable the transmitter to set its output power at high accuracy. At the same time, in an embodiment, the PA is controlled by a selectable PA control voltage and the selectable PA control voltage is selected to be a value, e.g. a minimum possible value, which enables the PA to operate at high efficiency. The accurate power setting and high efficiency are achieved over a wide range of operating conditions, while obtaining and storing only modest-size calibration data. As such, the disclosed techniques help to improve transmitter efficiency and power control accuracy, and reduce transmitter cost, size and calibration time.

FIG. 1 is a block diagram that schematically illustrates a transmitter 20 that uses power control, in accordance with an embodiment of the present disclosure. In the example of FIG. 1, transmitter is embodied in a mobile communication terminal (also referred to as a User Equipment—UE), which transmits uplink signals to a Base Station (BS) in accordance with the Universal Mobile Telecommunications System (UMTS) specifications. In alternative embodiments, transmitter may operate in accordance with any other suitable communication standard or protocol that uses transmit power control. Although the embodiments described herein are described with reference to uplink power control, it is noted that the disclosed techniques can be used to implement downlink power control, as well.

In an embodiment, transmitter 20 comprises a transmission chain 24, which accepts a baseband input signal, such as a digital baseband signal, and processes the signal to produce a modulated, low-power Radio Frequency (RF) signal. Transmission chain 24 typically amplifies, filters and up-converts the input signal. The gain that transmission chain 24 applies to the signal is programmable. In an embodiment, transmission chain 24 accepts a digital value, referred to herein as a digital gain, which sets the gain to be applied to the input signal.

The low-power RF signal produced by transmission chain 24 is amplified by a Power Amplifier (PA) 28. The power of the RF signal at the output of PA is denoted $PA_{OUT}$. In an embodiment, PA 28 is controlled, amongst other controls, by a selectable PA control voltage denoted $V_{CTRL}$ that can be selectably varied. In some embodiments, $V_{CTRL}$ denotes the supply voltage ($V_{CC}$) that powers the PA. In alternative embodiments, $V_{CTRL}$ comprises a bias voltage that biases one or more of the PA components (not shown in the figure).

In an embodiment, the efficiency of PA 28, i.e., the power consumption of the PA for a given $PA_{OUT}$, can be controlled by varying $V_{CTRL}$. For a given $PA_{OUT}$, lower $V_{CTRL}$ values typically correspond to higher efficiency, and vice versa. On the other hand, lowering $V_{CTRL}$ may also limit the output power that can be achieved by the PA. For a certain desired $PA_{OUT}$, $V_{CTRL}$ can be reduced and the PA efficiency can be increased accordingly, up to a limit at which the PA is no longer able to produce the RF signal at the desired output power $PA_{OUT}$ and at a specified signal fidelity.

The RF signal produced by PA 28 is provided to a duplexer 32. The duplexer filters the signal, and the signal is then transmitted toward the BS (not shown in the figure) using one or more antennas 36. In the present embodiment, antenna 36 is also used for receiving downlink signals from the BS. The downlink signals are filtered by duplexer 32 and provided to a downlink receiver (not shown in the figure).

Transmitter 20 comprises a controller 40, which manages the transmitter operation and controls the different transmitter elements. In a particular embodiment, controller 40 configures TX chain 24, for example by communicating an appropriate digital gain, and controls a voltage provided to PA 28, for example with the appropriate $V_{CTRL}$, so as to cause the transmitter to transmit uplink signals at the desired output power and operate at high efficiency.

In some embodiments, controller 40 comprises a power control module 44, which carries out the power control methods described herein. Module 44 accepts measurements of the PA output power $PA_{OUT}$ and/or the transmitter output power $P_{OUT}$, and also target values of $P_{OUT}$ and $V_{CTRL}$. The transmitter may measure $PA_{OUT}$ and $P_{OUT}$, for example, using couplers and power detectors that sense the signal at the output of PA 28 and at the output of duplexer 32, respectively. Typically, the target values of $P_{OUT}$ and $V_{CTRL}$ are provided to module 44 by other modules of controller 40, or by other UE components (not shown in the figure).

In the embodiments described herein, the term "transmitter output power" ($P_{OUT}$) refers to the signal power at the output of duplexer 32, i.e., at the input of antenna 36. In alternative embodiments, however, $P_{OUT}$ may denote the power of the signal transmitted by antenna 36, which can be sensed using any suitable means.

In an embodiment, transmitter 20 comprises a memory 48, which hold calibration data that is used by module 44 in setting the digital gain and $V_{CTRL}$. Typically, module 44 calculates and sets the digital gain and $V_{CTRL}$ based on the above-described inputs, as will be explained in detail below.

The transmitter configuration shown in FIG. 1 is a simplified example configuration, which is depicted for the sake of conceptual clarity. In alternative embodiments, any other suitable transmitter configuration can also be used. The different components of transmitter 20 may be implemented using dedicated hardware, such as using one or more Application-Specific Integrated Circuits (ASICs) and/or Field-Programmable Gate Arrays (FPGAs). Alternatively, some transmitter components may be implemented using software running on general-purpose hardware, or using a combination of hardware and software elements.

Typically, controller 40 comprises a general-purpose processor, which is programmed in software to carry out the functions described herein, although it too may be implemented on dedicated hardware. The software may be downloaded to the processor in electronic form, over a network, for example, or it may, alternatively or additionally, be provided and/or stored on tangible media, such as magnetic, optical, or electronic memory. In some embodiments, some or all of the elements of transmitter 20 may be fabricated in a chip-set. Transmitter elements that are not mandatory for explanation of the disclosed techniques have been omitted from FIG. 1 for the sake of clarity.

In some embodiments, transmitter 20 is requested by the BS to transmit at a certain output power level $P_{OUT}$. For example, in UMTS systems the BS sends to the UE Transmit Power Control (TPC) commands over the downlink channel. The TPC commands request the UE transmitter to increase or decrease its output power by a specified step (e.g., 1 dB or 2 dB). In response to the TPC commands, module 44 in controller 40 adjusts $P_{OUT}$ by modifying the digital gain and/or $V_{CTRL}$. The UMTS specifications specify the absolute and relative accuracies in setting $P_{OUT}$, and the power adjustments made by module 44 should typically meet these specifications. At the same time, it is typically desirable to operate PA 28 at the highest possible efficiency that still enables the transmitter to transmit at the target $P_{OUT}$ and at the specified signal fidelity, so as to reduce the transmitter power consumption.

Figure 2:
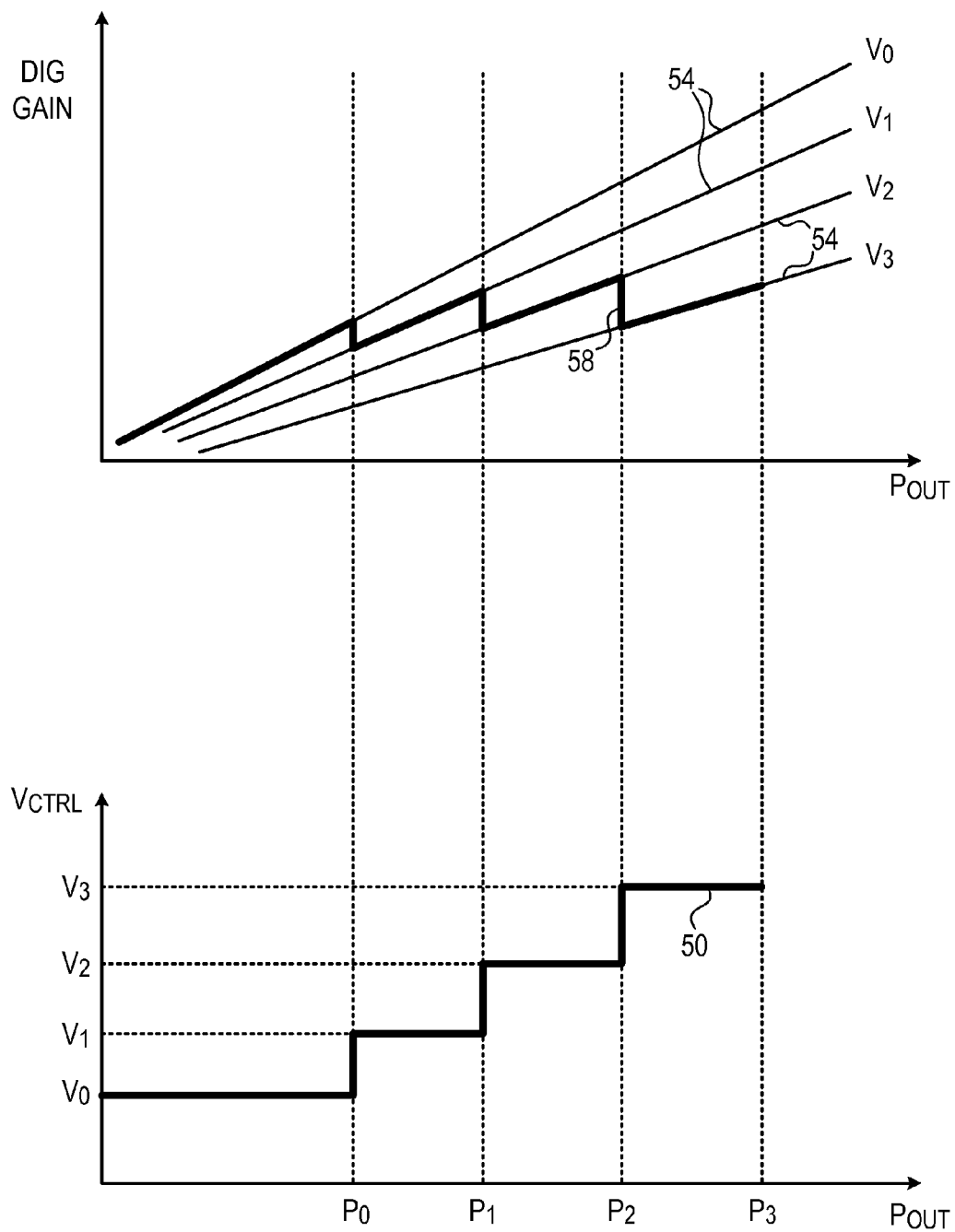
FIG. 2 is a graph showing calibration data for transmit power control, in accordance with an embodiment of the present disclosure.

FIG. 2 is a graph showing calibration data for transmit power control, in accordance with an embodiment of the present disclosure. The calibration data shown in FIG. 2 is typically stored in memory 48 of transmitter 20, and is used by module 44 in setting the digital gain of TX chain 24 and the PA control voltage $V_{CTRL}$ when the transmitter is requested to transmit at a certain output power $P_{OUT}$.

A curve 50 at the bottom graph in FIG. 2 shows the desired $V_{CTRL}$ as a function of output power $P_{OUT}$. As noted above, lower $V_{CTRL}$ values typically correspond to higher efficiency. Thus, the $V_{CTRL}$ values given by curve 50 are typically chosen to be sufficiently low so as to provide high efficiency, while still enabling the transmitter to transmit at the respective $P_{OUT}$ and at the specified signal fidelity. In the present example, the $P_{OUT}$ range is partitioned into several intervals, and each interval is assigned a respective $V_{CTRL}$ value.

In an example implementation, the $P_{OUT}$ range is between −57 dBm and +14 dBm. $V_{CTRL}$ is set to a constant minimum value $V_0$ below a certain power P0, in the present example −20 dBm. At higher output power levels, three $V_{CTRL}$ values are specified: $V_1$ for $P_0<P_{OUT}\leq P_1$. $V_2$ for $P_1<P_{OUT}\leq P_2$, and $V_3$ for $P_2<P_{OUT}\leq P_3$. Any suitable number of intervals, and any suitable values of $P_0, P_1, \ldots$ and $V_0, V_1, \ldots$ can be used.

At the top of FIG. 2, curves 54 show the desired digital gain values as a function of $P_{OUT}$. Each curve 54 gives the digital gain as a function of $P_{OUT}$ for a specific $V_{CTRL}$ value ($V_0, V_1, \ldots$). In many transmitter implementations, it is impractical to store such a large number of digital gain values in memory 48. Thus, in some embodiments, only the digital gain values that lie on a piece-wise curve 58 are actually stored. For each $P_{OUT}$ value, Curve 58 gives the digital gain value that is applicable when the PA is controlled with the $V_{CTRL}$ value given in curve 50. In these embodiments, the calibration data comprises no more than a single $V_{CTRL}$ value and a single digital gain value for each output power level.

In some embodiments, the calibration data stored in memory 48 comprises a finite set of data points from curve 50 (i.e., calibrated $V_{CTRL}$ values corresponding to a finite set of $P_{OUT}$ levels), and a finite set of data points from curve 58 (i.e., calibrated digital gain values corresponding to a finite set of $P_{OUT}$ levels). In an example embodiment, memory 48 holds three tables. One table holds $V_{CTRL}$ values for respective $P_{OUT}$ levels, e.g., at a resolution of 1 dB. Another table holds digital gain values for the respective $P_{OUT}$ levels. Yet another table indicates the slope (gradient) of curve 58, i.e., $\Delta(\text{digital gain})/\Delta P_{OUT}$ at each of the $P_{OUT}$ levels. In alternative embodiments, the calibration data can be represented and stored using any other suitable representation or data structure.

Typically, the $V_{CTRL}$ data points are obtained by performing characterization measurements on a number of transmitters belonging to a given type, and the digital gain and slope data points are obtained by calibration measurements on each individual transmitter. Alternatively, the calibration data can be obtained using any other suitable means.

Note that the $V_{CTRL}$ and digital gain values are chosen at certain reference operating conditions (e.g., temperature, frequency and signal modulation) at which the calibration or characterization procedure is performed. When the actual operating conditions of the transmitter deviate from these reference conditions, the desired $V_{CTRL}$ and digital gain values may deviate from those specified in the calibration data.

For example, calibration and characterization may be performed at a certain frequency, at a temperature T of 25° C. and at a certain modulation (e.g., a modulation having a Cubic Metric—CM—of zero). Transmitter 20, however, may be specified to operate over a wide range of operating conditions, e.g., −40° C.$\leq T \leq$+80° C., 0$\leq$CM$\leq$3.5 and a wide frequency range. Thus, the $V_{CTRL}$ and digital gain values that are suitable for the actual operating conditions of the transmitter may deviate considerably from the calibration data.

In some embodiments, when transmitter 20 is requested to transmit at a certain target $P_{OUT}$, controller 40 determines a target $V_{CTRL}$ value that matches the actual operating conditions of the transmitter. The target $V_{CTRL}$ value often deviates from the $V_{CTRL}$ value corresponding to the target $P_{OUT}$ in the calibration data. As such, the corresponding digital gain given in the calibration data is often inaccurate for the current operating conditions, as well. In some embodiments, module 44 computes an actual $V_{CTRL}$ value and a modified digital gain value for controlling the PA and the TX chain, based on the target $P_{OUT}$, target $V_{CTRL}$ and the calibration data. When the PA and TX chain are set according to these values, the transmitter transmits at the requested target $P_{OUT}$ and operates at high efficiency and at the specified signal fidelity, even though the actual operating conditions differ from those used for producing the calibration data.

Figure 3:
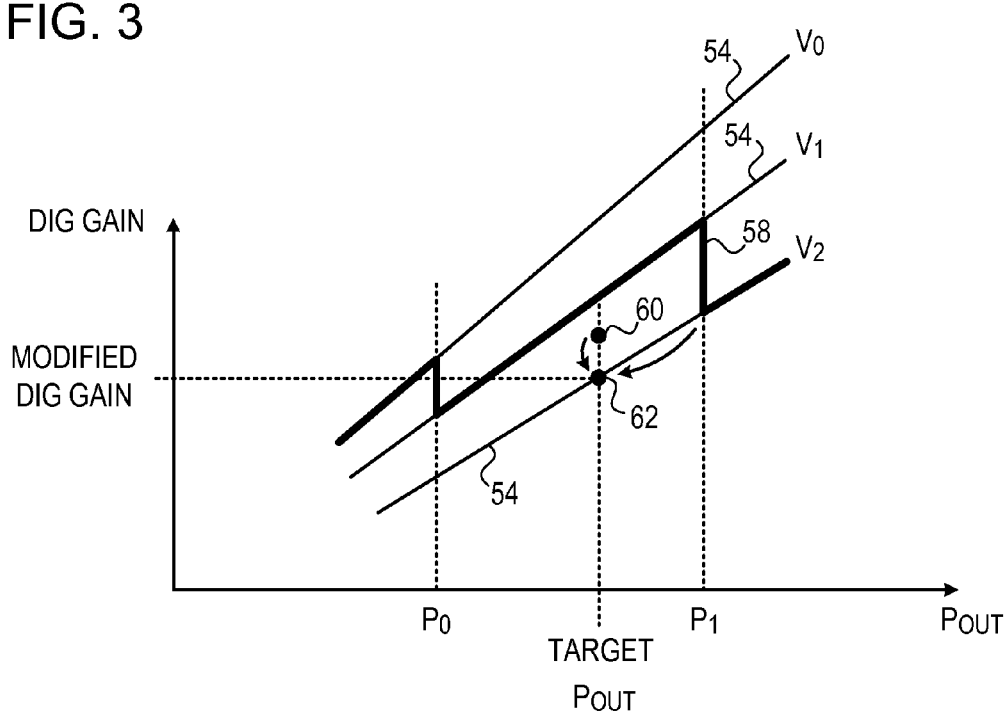
FIG. 3 is a graph that schematically illustrates a process for determining a Power Amplifier (PA) control voltage and a transmission chain gain during transmit power control, in accordance with an embodiment of the present disclosure.

FIG. 3 is a graph that schematically illustrates an example process for computing the actual $V_{CTRL}$ and the modified digital gain, in accordance with an embodiment of the present disclosure. FIG. 3 reproduces a certain region in the calibration data (part of curve 58) of FIG. 2 above. The process begins when controller 40 is requested to set transmitter 20 to transmit at a certain target $P_{OUT}$ shown in FIG. 3. According to the actual operating conditions of the transmitter, controller 40 computes a target $V_{CTRL}$ 60 that is to be applied to PA 28.

Controller 40 may determine the target $V_{CTRL}$ value using any suitable method. An example method is described in the U.S. patent application entitled "Setting of Power Amplifier Control Voltage," Ser. No. 12/772,211, cited above.

As can be seen in the figure, target $V_{CTRL}$ 60 does not lie on curve 58. In other words, the target $V_{CTRL}$ differs from the $V_{CTRL}$ value that corresponds to the target $P_{OUT}$ in the calibration data. In some embodiments, module 44 substitutes target $V_{CTRL}$ 60 with an actual $V_{CTRL}$ 62. The actual $V_{CTRL}$ is defined as the closest $V_{CTRL}$ value in the calibration data that is larger than or equal to target $V_{CTRL}$ 60. In the present example, target $V_{CTRL}$ 60 is larger than $V_1$ and smaller than $V_2$, and therefore module 44 chooses $V_2$ as actual $V_{CTRL}$ 62.

Having selected the actual $V_{CTRL}$, module 44 extrapolates the digital gain calibration data of this actual $V_{CTRL}$ to reach target $P_{OUT}$. In the example of FIG. 3, module 44 extrapolates curve 54 of $V_2$ to reach target $P_{OUT}$. The extrapolated value of the digital gain curve, at target $P_{OUT}$, is used as the modified digital gain. In some embodiments, module 44 extrapolates the digital gain calibration data using the table of digital gain slopes, $\Delta$(digital gain)/$\Delta P_{OUT}$, described above. Finally, module 44 configures TX chain 24 with the modified digital gain computed above, and controls PA 28 with the actual $V_{CTRL}$ ($V_2$ in the present example).

Figure 4:
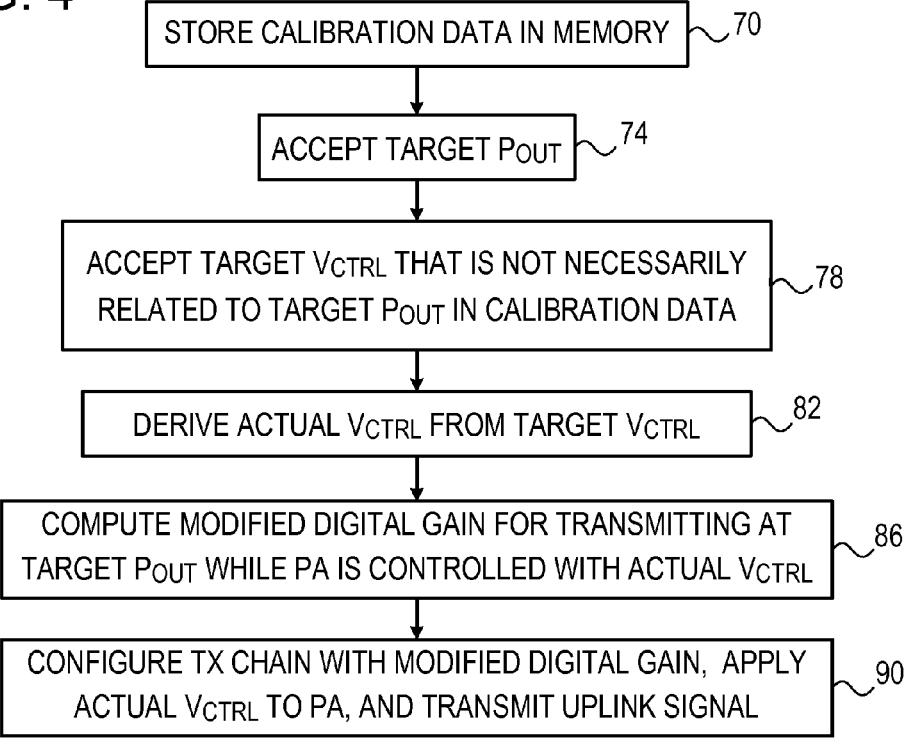
FIG. 4 is a flow chart that schematically illustrates a method for transmit power control, in accordance with an embodiment of the present disclosure.

FIG. 4 is a flow chart that schematically illustrates a method for transmit power control, in accordance with an embodiment of the present disclosure. The method begins at a calibration storage operation 70, with the calibration data being stored in memory 48. At a $P_{OUT}$ input operation 74, module 44 accepts a target $P_{OUT}$ at which the transmitter is to operate. The target $P_{OUT}$ may be computed, for example, based on TPC commands received from one or more BS.

At a control voltage input operation 78, module 44 accepts a target $V_{CTRL}$ value, which may differ from the $V_{CTRL}$ value that corresponds to the target $P_{OUT}$ in the calibration data. The difference may be due to the fact that the present operating conditions of the transmitter are different from the operating conditions at which the calibration data was obtained.

At an actual $V_{CTRL}$ derivation operation 82, module 44 determines an actual $V_{CTRL}$ value for controlling PA 28, based on the target $V_{CTRL}$ value. For example, module 44 may select the $V_{CTRL}$ value in the calibration data, which is closest to but not smaller than the target $V_{CTRL}$. At a gain computation operation 86, module 44 computes a modified digital gain value for controlling TX chain 24, based on the actual $V_{CTRL}$ value. For example, module 44 may extrapolate the digital gain calibration data of the selected actual $V_{CTRL}$, so as to determine the extrapolated digital gain value at the target $P_{OUT}$.

At a configuration and transmission operation 90, module 44 configures TX chain 24 with the modified digital gain value (computed at operation 86), and controls PA 28 with the actual $V_{CTRL}$ (computed at operation 82). The transmitter transmits an uplink signal to the BS using this digital gain and $V_{CTRL}$ setting.

Using the power control techniques described herein, transmitter 28 transmits the uplink signal at an output power level that matches the target $P_{OUT}$ with high accuracy. At the same time, PA 28 is controlled by a control voltage that is close to the minimal possible value, and therefore operates at high efficiency. The accurate power setting and high efficiency are achieved over a wide range of operating conditions, and while obtaining and storing only modest-size calibration data.

Although the embodiments described herein mainly address wireless communication transmitters, the methods and systems described herein can also be used in other applications, such as in radar transmitters, transmitters fitted in test equipment or medical equipment, as well as wire-line RF transmitters such as cable transmitters.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for transmit power control, comprising:
   in a transmitter that includes a transmission chain and a Power Amplifier (PA), storing calibration data relating to a plurality of specified output power levels of the transmitter to respective parameters for application to the PA and to the transmission chain that cause the transmitter to output signals at the respective specified output power levels;
   computing actual parameters for a requested target output power level of the transmitter, based on the calibration data relating to an output power level other than the requested target output power level; and
   applying the computed actual parameters to the PA and to the transmission chain.

2. The method according to claim 1, wherein computing the actual parameters comprises extrapolating the parameters from a range of the output power levels that does not contain the requested target output power level.

3. The method according to claim 1, wherein storing the calibration data comprises storing, for each of the specified output power levels, a respective PA control voltage for application to the PA.

4. The method according to claim 1, wherein storing the calibration data comprises storing, for each of the specified output power levels, a respective gain level for application to the transmission chain.

5. The method according to claim 1, wherein the actual parameters differ from the parameters that are related to the requested target output power level in the calibration data.

6. The method according to claim 1, wherein storing the calibration data comprises:
   storing a first relation that defines PA control voltages to be applied to the PA for outputting the signals at the respective output power levels; and
   storing a second relation that defines gain levels which, when applied to the transmission chain while the PA is controlled using the respective control voltages defined by the first relation, cause the transmitter to output the signals at the respective output power levels.

7. The method according to claim 6, wherein storing the first relation comprises determining the first relation by characterizing a type of the transmitter.

8. The method according to claim 6, wherein storing the calibration data comprises storing a third relation that maps the output power levels to respective gradients of a dependence of gain levels of the of the transmission chain on the output power levels.

9. The method according to claim 8, comprising determining the second and third relations by individually calibrating the transmitter.

10. A transmitter, comprising:
   a transmission chain;
   a Power Amplifier (PA) driven by the transmission chain;
   a memory for storing calibration data, which relate a plurality of specified output power levels of the transmitter to respective parameters for application to the PA and to the transmission chain that cause the transmitter to output signals at the respective specified output power levels; and
   a controller, which is configured to compute actual parameters for a requested target output power level of the transmitter based on the calibration data relating to an output power level other than the requested target output power level, and to apply the computed actual parameters to the PA and to the transmission chain.

11. The transmitter according to claim 10, wherein the controller is configured to compute the actual parameters by extrapolating the parameters from a range of the output power levels that does not contain the requested target output power level.

12. The transmitter according to claim 10, wherein the memory is configured to store the calibration data by storing, for each of the specified output power levels, a respective PA control voltage for application to the PA.

13. The transmitter according to claim 10, wherein the memory is configured to store the calibration data by storing, for each of the specified output power levels, a respective gain level for application to the transmission chain.

14. The transmitter according to claim 10, wherein the processor is configured to compute the actual parameters such that the actual parameters differ from the parameters that are related to the requested target output power level in the calibration data.

15. The transmitter according to claim 10, wherein the memory is configured to store the calibration data by storing:
   a first relation that defines PA control voltages to be applied to the PA for outputting the signals at the respective output power levels; and
   a second relation that defines gain levels which, when applied to the transmission chain while the PA is controlled using the respective control voltages defined by the first relation, cause the transmitter to output the signals at the respective output power levels.

16. The transmitter according to claim 15, wherein the memory is configured to store the first relation, which is determined by characterizing a type of the transmitter.

17. The transmitter according to claim 15, wherein the memory is configured to store the calibration data by storing a third relation that maps the output power levels to respective gradients of a dependence of gain levels of the of the transmission chain on the output power levels.

18. The transmitter according to claim 17, wherein the memory is configured to store the second and third relations, which are determined by individually calibrating the transmitter.

19. A mobile communication terminal comprising the transmitter of claim 10.

20. A chipset for processing signals in a mobile communication terminal, comprising the transmitter of claim 10.

* * * * *